United States Patent
Hofmann et al.

(10) Patent No.: US 9,850,948 B2
(45) Date of Patent: Dec. 26, 2017

(54) ROLLING BEARING CAGE OR CAGE ELEMENT

(71) Applicant: AKTIEBOLAGET SKF, Göteborg (SE)

(72) Inventors: Sabine Hofmann, Wuerzburg (DE); Baozhu Liang, Dittelbrunn-Hambach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/105,859

(22) PCT Filed: Dec. 10, 2014

(86) PCT No.: PCT/EP2014/077260
§ 371 (c)(1),
(2) Date: Sep. 7, 2016

(87) PCT Pub. No.: WO2015/091165
PCT Pub. Date: Jun. 25, 2015

(65) Prior Publication Data
US 2017/0002865 A1    Jan. 5, 2017

(30) Foreign Application Priority Data
Dec. 19, 2013 (DE) .................. 10 2013 226 550

(51) Int. Cl.
*F16C 33/46* (2006.01)
*F16C 33/66* (2006.01)
*F16C 33/51* (2006.01)

(52) U.S. Cl.
CPC ...... *F16C 33/4676* (2013.01); *F16C 33/4617* (2013.01); *F16C 33/51* (2013.01);
(Continued)

(58) Field of Classification Search
CPC .............. F16C 33/4617; F16C 33/4623; F16C 33/4629; F16C 33/4635; F16C 33/4676;
(Continued)

(56) References Cited

U.S. PATENT DOCUMENTS

| 5,033,878 A * | 7/1991 | Tsuji | F16C 23/086 |
| | | | 384/576 |
| 8,523,451 B2 | 9/2013 | Ozu et al. | |

FOREIGN PATENT DOCUMENTS

| DE | 9306319 U1 * | 6/1993 | ............ F16C 19/466 |
| DE | 102006001593 B3 | 3/2007 | |

(Continued)

*Primary Examiner* — Phillip A Johnson
(74) *Attorney, Agent, or Firm* — Bryan Peckjian; SKF USA Inc. Patent Dept.

(57) ABSTRACT

A rolling-element bearing cage or cage element includes at least one axial bridge region having first and second guide surfaces, the first guide surface and the second guide surface each have a recessed region axially between first and second non-recessed regions, at least one V-shaped receiving space in a radial outer surface of the rolling-element bearing cage or cage element configured to receive lubricant, and first and second fluid channels extending from the at least one receiving space to the recessed regions of the first and second guide surfaces. The fluid channels have rectangular cross sections, are about as wide as a width of the recessed regions, and are angled at an acute angle to a radial direction, and the receiving space is approximately as wide as the recessed regions.

10 Claims, 2 Drawing Sheets

(52) U.S. Cl.
CPC ...... *F16C 33/6614* (2013.01); *F16C 33/6629* (2013.01); *F16C 33/6651* (2013.01); *F16C 2220/04* (2013.01)

(58) Field of Classification Search
CPC .... F16C 33/51; F16C 33/513; F16C 33/6614; F16C 33/6651
See application file for complete search history.

(56) References Cited

FOREIGN PATENT DOCUMENTS

| | | | | |
|---|---|---|---|---|
| DE | 102008049036 A1 | | 4/2010 | |
| DE | 102008059571 A1 | | 6/2010 | |
| EP | 0164968 A1 | | 12/1985 | |
| FR | 3009046 B1 | * | 1/2016 | .......... F16C 33/6651 |
| JP | 01320321 A | * | 12/1989 | ............ F16C 23/086 |
| JP | 2000291668 A | | 10/2000 | |
| JP | 2003206932 A | | 7/2003 | |
| JP | 2003287033 A | * | 10/2003 | ............ F16C 19/364 |
| JP | 2005054836 A | | 3/2005 | |
| JP | 2005121097 A | * | 5/2005 | .......... F16C 33/4676 |
| JP | 2007010026 A | * | 1/2007 | ............. F16C 19/26 |
| JP | 2007100909 A | | 4/2007 | |
| JP | 2008261478 A | | 10/2008 | |
| JP | 2013145024 A | * | 7/2013 | .......... F16C 33/4676 |
| JP | 5610013 B2 | * | 10/2014 | .......... F16C 33/6681 |

\* cited by examiner

ROLLING BEARING CAGE OR CAGE ELEMENT

CROSS-REFERENCE

This application is the U.S. National Stage of International Application No. PCT/EP2014/077260 filed on Dec. 10, 2014, which claims priority to German patent application no. 10 2013 226 550.6 filed on Dec. 19, 2013.

TECHNOLOGICAL FIELD

The invention relates to a rolling-element bearing cage or a rolling-element bearing cage-element, comprising at least one bridge region extending in an axial direction, which bridge region includes guide surfaces for rolling elements on two sides facing away from each other.

BACKGROUND

A rolling-element bearing cage of the above-mentioned type or such a rolling-element bearing cage-element is known from JP 2007 100 909 A. The rolling-element bearing cage element disclosed here includes a number of lubrication channels, via which the lubricant can reach into the contact surfaces to the rolling elements. JP 2003 206 932 A1, DE 10 2008 049 036 A1, JP 2008 261 478 A, DE 10 2006 001 593 B3, JP 2000 291 668 A, U.S. Pat. No. 8,523,451 B2, DE 10 2008 059 571 A1, and JP 2005 054 836 A show similar and other solutions.

The guiding of rolling elements—whether designed as rollers or balls—in a rolling-element bearing using cages is well known. The cages here can be classically configured, i.e., include two side rings between which bridges extend. They can also be cage segments that are placed between two rolling elements, which cage segments, however, are not connected via side rings.

In this context it is important to supply sufficient lubricant to the rolling elements for their rolling contact.

It is known in this regard that primarily only the lubricant in the vicinity of the cage pockets is usable for active bearing lubrication. To date the rolling contact surface between the cage bridge and the rolling element is provided with a large osculation diameter of the contact surface on the bridge so that lubricant can come into direct rolling contact. However, since the gap thereby arising between cage bridge and rolling element can only be embodied to a very limited degree so that the cage bridge maintains its guiding property, also only a very limited amount of lubricant can be held in rolling contact.

To date the problem of insufficient lubrication in the rolling contact between the cage bridge and the rolling element has been addressed by providing the rolling-contact surface on the cage bridge with an osculation diameter that is larger than the diameter of the rolling element. The lubricant can flow into the gap thus arising between the rolling-contact surface on the cage bridge and the rolling element. Disadvantageously, a relatively frequent relubrication of the bearing is required in order to maintain its function or avoid wear, since the receiving capacity for lubricating grease is relatively low.

SUMMARY

The object of the present invention is therefore to provide a rolling-element bearing cage of the above-described type or a rolling-element bearing cage-element of the above-described type that on the one hand makes possible a good lubricating of the rolling contact, however on the other hand also ensures a good guiding of the rolling element. A further goal of the present invention is to design the cage or the cage segment such that an advantageous (injection) molding process results, which leads to a uniform material distribution with high surface quality.

The solution of this object by the invention is characterized in that at least one receiving space for lubricant per bridge region is disposed in the rolling-element bearing-cage or -cage-element, wherein for each receiving space a single fluid channel extending in the interior of the rolling-element bearing-cage or -cage-segment leads from the receiving space to each guide surface, wherein the receiving space is disposed in the radially outer bridge region and, viewed in the axial direction, has a V-shaped cross-sectional shape, wherein the fluid channels open in a region of the guide surface that is recessed with respect to the guide surfaces, wherein the two fluid channels have a rectangular cross-section and extend over the width of the recessed region of the guide surface, and wherein the two fluid channels fall off at an acute angle to the radial direction to their outlet on the guide surface.

The mentioned V-shaped cross-sectional shape is preferably dimensioned here such that a structure arises wherein the cage or the cage segment has a shape in the radially outer region, which shape has essentially constant wall thickness. This promotes a good formation of the component surface after molding or injection molding.

The offset amount here of the recessed region with respect to the guide surfaces—measured normal to the guide surface—is, in an advantageous manner, between 0.4% and 2.5% of the diameter of the rolling element. With such a configuration sufficient space is provided for the lubricant without disadvantageously influencing the guiding property of the cage element. Preferably a single recessed region per guide surface is provided, which is disposed between two axial end regions of the (not recessed) guide surfaces; however, it is also possible that a plurality of recessed regions per guide surface are provided that are disposed between two axial end regions of the guide surfaces.

The axial extension of the receiving space preferably corresponds to the axial extension of the recessed region.

According to a further development the at least one recessed region ends before reaching the radially outer and/or radially inner edge of the rolling-element bearing-cage or -cage-element. In this case the recessed region is then closed both in the axial direction and in the radial direction.

According to one possible embodiment the rolling-element bearing cage has two side rings, between which a number of bridge regions extend in order to form a number of receiving pockets for rolling elements, which number corresponds to the number of rolling elements.

Alternatively it can also be provided that a rolling-element bearing cage element is configured as a cage segment that in intended use is placed between two adjacent rolling elements and that has no connection to a side ring.

In essence the invention thus proposes a lubricant reservoir on the cage bridge. Said reservoir is useful for optimizing the supply of lubricant in the rolling contact and for providing a larger amount of lubricant. The reservoir is therefore an additional receiving space for lubricant, which receiving space is introduced in the cage bridge.

The proposed solution can be used on all types of cages or also cage segments wherein the concept can be used both for ball- and for roller-bearings.

Due to the disposing of at least one recess (i.e., a recessed region) on the guide surfaces of the cage bridge, and due to the lubricant reservoir that is connected to the said recessed region via a fluid channel, a sufficient supplying of lubricant is always ensured in the rolling contact. The service life of the lubricant and also of the bearing is thus advantageously increased.

With the proposed design it is achieved that on the one hand an easily accessible receiving space for the lubricant is available (which is namely disposed in the radially outer-lying bridge region and easily fillable with lubricant due to its V-shaped cross-sectional shape) and on the other hand a wide-surface lubricating of the contact region can occur since the fluid channel, configured rectangularly in section, extends over the entire width of the recessed region of the guide surface. Thus first of all the supplying of the cage is possible in a simple manner; furthermore, without high flow resistance the lubricant reaches the contact point between cage and rolling element.

A further significant advantage of the proposed solution consists in that due to the cross-sectional shape of the recess in the cage or in the cage segment, which cross-sectional shape is designed V-shaped in the radially outer region, a cage structure arises that prevents material accumulations and instead of this—due to the V-shaped recess—leads to a shape of the cage or of the segment in the radially outer region that has essentially same-size wall thicknesses. Namely it has been shown that in manufacturing in particular by injection molding (both of metal and of plastic), undesirable material accumulations occur with previously known cages, which lead to cavities or other imperfections (sink marks on the component surface) during hardening or cooling of the material. This is advantageously prevented in a targeted manner by the envisaging of the V-shaped recess.

BRIEF DESCRIPTION OF THE DRAWINGS

An exemplary embodiment of the invention is depicted in the drawings.

DETAILED DESCRIPTION

In the Figures a part of a cylindrical roller bearing can be seen, wherein here a cage bridge is placed as a classical cage or a cage segment between two cylindrical rollers.

Figure 1:
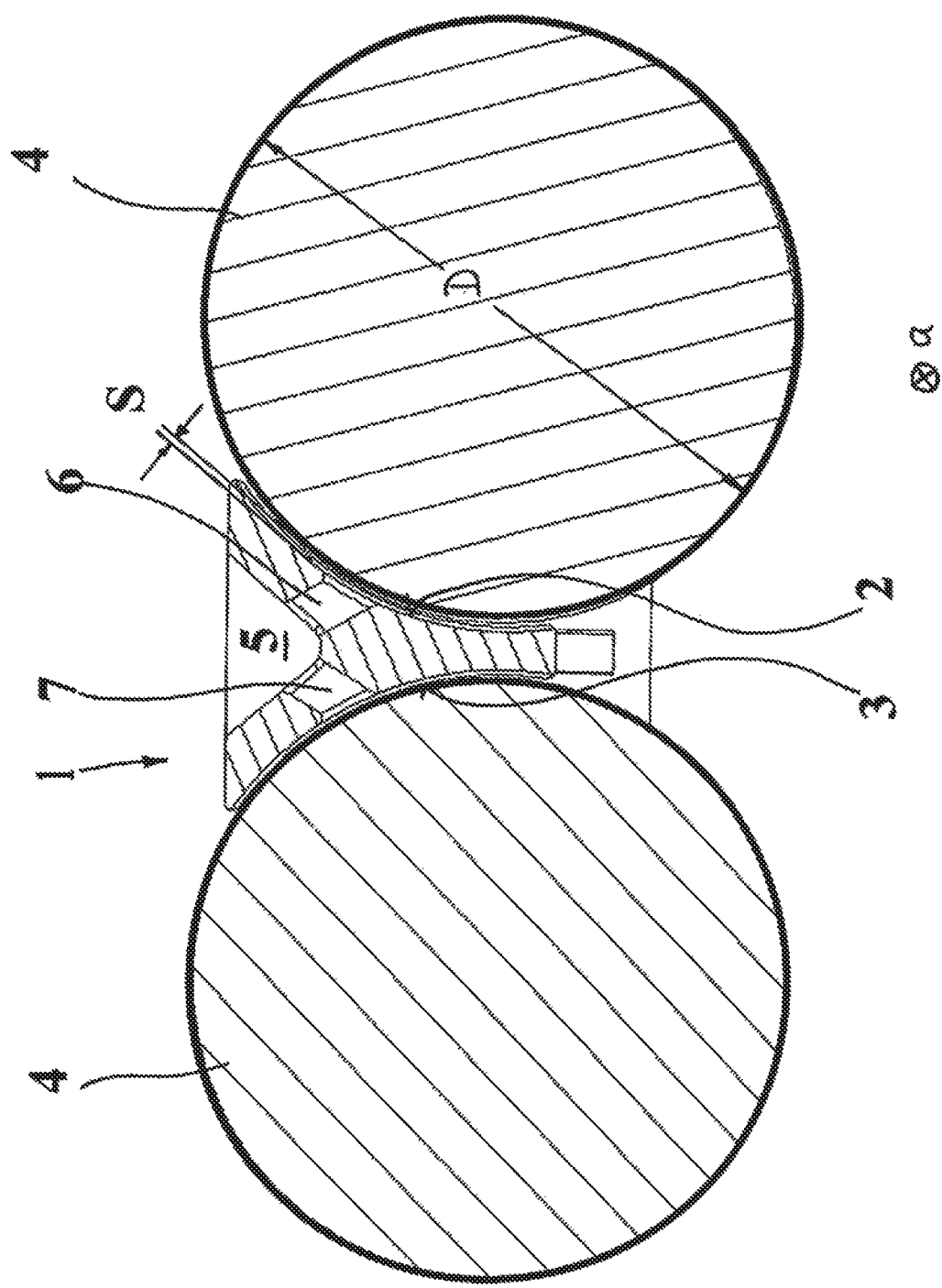
FIG. 1 shows two rolling elements of a rolling-element bearing in the form of a cylindrical roller bearing, wherein a cage bridge is disposed between the two rolling elements, seen in the axial direction of the bearing.

In FIG. 1 two rolling elements 4 can be seen, wherein a cage segment 1 is placed between them. The cage segment 1 in the form of a cage bridge—which is depicted isolated in FIG. 2—includes two guide surfaces 2 and 3 that are disposed facing away from each other on the cage element 1 and each facing a rolling element 4. The cage element 1 extends in an axial direction a.

Figure 2:
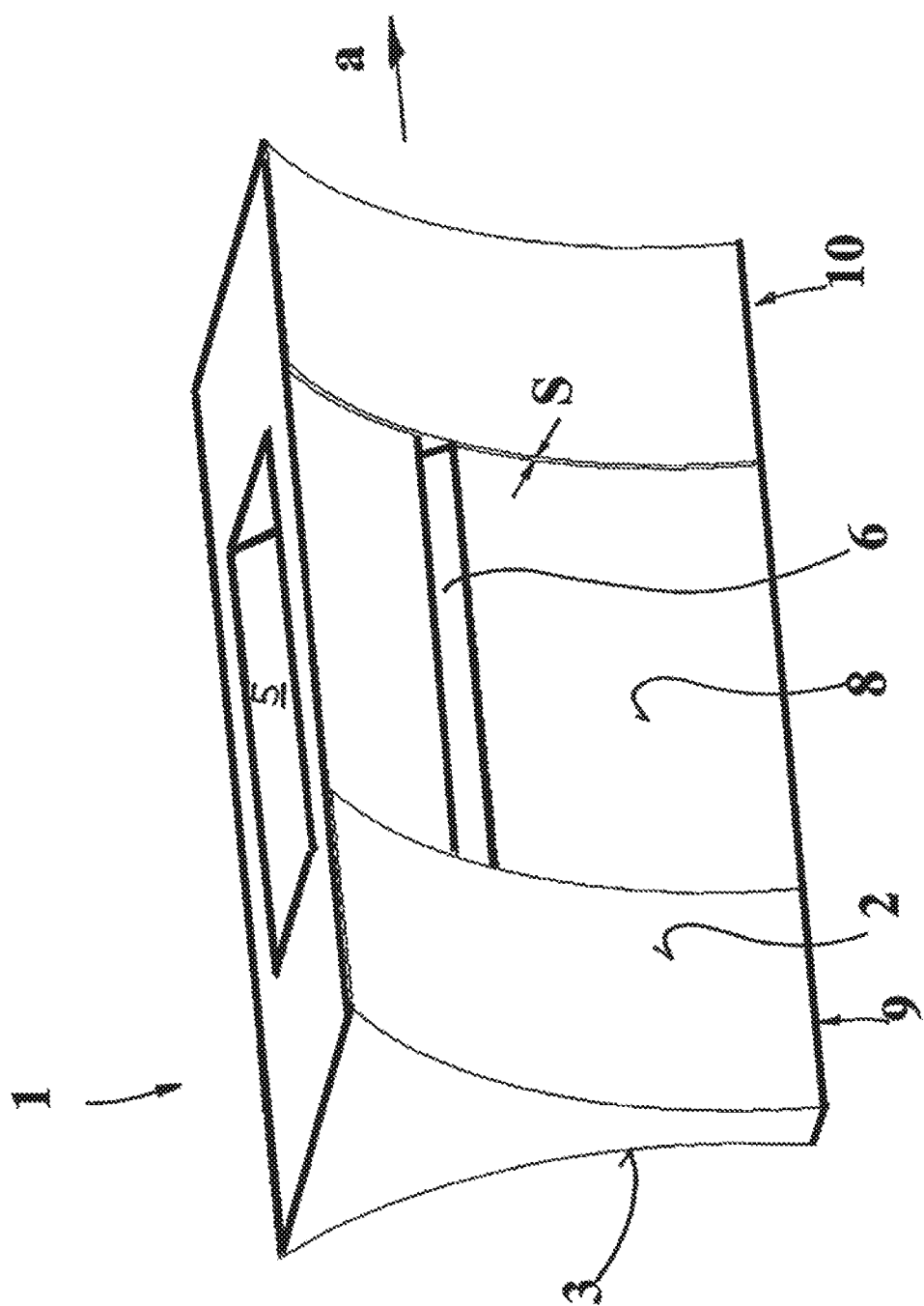
FIG. 2 shows the cage bridge according to FIG. 1 in perspective view.

Here the guide surfaces 2 and 3, as can best be seen from FIG. 2, are not configured continuous, but rather they include a recessed region 8 that is delimited or flanked by two axial end regions 9 and 10. The offset amount s, by which the region 8 is recessed with respect to the end regions 9, 10, is not large and is, for example, 1% of the diameter D of the rolling element 4.

The end regions 9, 10 are configured identically-sized and have an extension in an axial direction a that preferably corresponds to between 15% and 30% of the total axial extension of the cage element 1.

A receiving space 5 for lubricant is disposed in the cage element 1. Here viewed in axial direction a the receiving space 5 in the exemplary embodiment (see FIG. 1) has a V-shaped cross-sectional shape. The V-shaped design of the receiving space here corresponds with the also-generally-V-shaped design of the cage element 1 itself. From each receiving space 5 a fluid channel 6 and 7 leads to a guide surface 2 and 3 respectively. The fluid channel 6 or 7 discharges here in the recessed region 8.

Recesses are thus provided—formed as recessed regions 8—on the guide surfaces 2, 3 of the cage bridge 1. The receiving space 5 serves as a lubricant reservoir and directs lubricant into the recessed regions 8 via the fluid channels 6, 7. The rolling contact between rolling element 4 and cage bridge 1 is thus optimally supplied with lubricant.

Alternatively the recessed regions 8 can be not-continuously formed in the radial direction (perpendicular to the direction a), but provided with boundaries.

The cage element 1 can be embodied as a casting made of plastic or made of a steel alloy, wherein the required geometry including the fluid channels 6, 7 can be realized cost-effectively in a known manner by slides in the injection mold.

As can be seen overall, (at least) one receiving space 5 for the lubricant thus arises in the cage segment 1, wherein for each receiving space 5 only a single fluid channel extending in the interior of the cage element 1 leads from the receiving space 5 to each of the two guide surfaces 2 and 3. The receiving space 5 is disposed in the radially outer bridge region and has—seen in axial direction a—the V-shaped cross-sectional shape. The fluid channels 6 and 7 open in the region 8 of the guide surface 2, 3 that is recessed with respect to the guide surfaces 2, 3; the two fluid channels 6 and 7 have a rectangular cross-section and extend over the width of the recessed region 8 of the guide surface 2, 3. As can further be seen the two fluid channels 6 and 7 fall off from the receiving space 5 at an acute angle—which in the exemplary embodiment falls at approximately 30° (between 20° and 50° are preferred)—towards the radial direction to its outlet on the guide surface 2, 3. What is meant here is the angle that arises between the longitudinal axis of the straight-configured fluid channel 6, 7 and the radial direction.

REFERENCE NUMBER LIST

1 Rolling-element bearing-cage or -cage-element
2 Guide surface
3 Guide surface
4 Rolling element
5 Receiving space (reservoir)
6 Fluid channel
7 Fluid channel
8 Recessed region
9 Axial end region of the guide surface
10 Axial end region of the guide surface
a Axial direction
s Offset amount
D Diameter of the rolling element

The invention claimed is:

1. A rolling-element bearing-cage or -cage-element, comprising at least one bridge region extending in an axial direction (a), wherein the bridge region includes two guide surfaces for rolling elements on two sides facing away from each other, wherein at least one receiving space configured to receive lubricant is disposed in the rolling-element bearing-cage or -cage-element, wherein a single fluid channel extending in the interior of the rolling-element bearing-cage or -cage-element leads from the at least one receiving space to each guide surface, wherein the at least one receiving space is disposed in the radially outer bridge region and, seen in the axial direction (a), has a V-shaped cross-sectional shape, wherein the fluid channel opens in a region of the guide surface that is recessed with respect to the guide surface, wherein the fluid channel has a rectangular cross-section and extends over a width of the recessed region of the guide surface, wherein the fluid channel fall off from the receiving space at an acute angle to the radial direction and wherein an axial extension of the at least one receiving space corresponds to the axial extension of the recessed regions.

2. The rolling-element bearing-cage or -cage-element according to claim 1, wherein an offset amount (s) of the recessed region with respect to each guide surface, measured normal to the guide surface, is between 0.4% and 2.5% of a diameter (D) of the rolling elements.

3. The rolling-element bearing-cage or -cage-element according to claim 1, wherein single recessed region is disposed centrally between two axial end regions of the guide surfaces.

4. The rolling-element bearing-cage or -cage-element according to claim 1, wherein each recessed region ends before reaching a radially outer and/or a radially inner edge of the rolling-element bearing-cage or -cage-element.

5. The rolling-element bearing cage according to claim 1, further including two side rings, between which the at least one bridge region extends in order to form a number of receiving pockets, wherein the number corresponds to the number of rolling elements.

6. The rolling-element bearing cage-element according to claim 1 configured as a cage segment configured to be placed between two adjacent rolling elements with no connection to a side ring.

7. The rolling-element bearing-cage or -cage-element according to claim 1, wherein an offset amount of the recessed region with respect to each guide surface, measured normal to the guide surface, is between 0.4% and 2.5% of a diameter (D) of the rolling elements, wherein recessed region is disposed centrally between two axial end regions of the guide surfaces, wherein each recessed region ends before reaching a radially outer and/or a radially inner edge of the rolling-element bearing-cage or -cage-element, and further including two side rings, between which the at least one bridge region extends in order to form a number of receiving pockets.

8. A rolling-element bearing cage or cage element, comprising:

at least one axial bridge region having a first guide surface and a second guide surface facing away from the first guide surface, the first guide surface and the second guide surface being configured to guide rolling elements, the first guide surface and the second guide surface each including a recessed region located axially between first and second non-recessed regions, at least one receiving space in a radial outer surface of the rolling-element bearing cage or cage element configured to receive lubricant, the at least one receiving space having a substantially V-shaped cross section, and a single first fluid channel having a first longitudinal axis extending from the at least one receiving space to the recessed region of the first guide surface and a single second fluid channel having a second longitudinal axis extending from the at least one receiving space to the recessed region of the second guide surface, wherein the first fluid channel and the second fluid channel each have a rectangular cross section, wherein the first fluid channel has an axial width substantially equal to an axial width of the recessed region of the first guide surface and the second fluid channel has an axial width substantially equal to an axial width of the recessed region of the second guide surface, wherein the first longitudinal axis makes a first acute angle with a radial direction and the second longitudinal axis makes a second acute angle with the radial direction, and wherein an axial width of the receiving space is substantially equal to an axial width of the recessed region of the first guide surface.

9. The rolling-element bearing cage or cage element according to claim 8, wherein the recessed portion of the first guide surface is recessed relative to the first and second non-recessed regions by 0.4% to 2.5% of a diameter of the rolling elements.

10. The rolling-element bearing cage or cage element according to claim 8, wherein the recessed region of the first guide surface is the only recessed region on the first guide surface and wherein the recessed region of the second guide surface is the only recessed region on the second guide surface.

* * * * *